(12) United States Patent
Ko et al.

(10) Patent No.: US 8,040,917 B2
(45) Date of Patent: Oct. 18, 2011

(54) APPARATUS AND METHOD FOR UPGRADING CODEC

(75) Inventors: Jae-woo Ko, Uiwang-si (KR); Hee-min Kwon, Seoul (KR); Jun-hyeong Kim, Anyang-si (KR); Joung-hoon Choo, Seoul (KR); Sang-do Park, Seoul (KR); Jung-min Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 470 days.

(21) Appl. No.: 11/723,636

(22) Filed: Mar. 21, 2007

(65) Prior Publication Data

US 2007/0258481 A1    Nov. 8, 2007

(30) Foreign Application Priority Data

May 3, 2006    (KR) .................. 10-2006-0040044

(51) Int. Cl.
    *H04J 3/16*    (2006.01)
(52) U.S. Cl. ............. 370/468; 370/466; 725/50; 725/51
(58) Field of Classification Search ........................ None
    See application file for complete search history.

(56) References Cited

U.S. PATENT DOCUMENTS

| | | | | |
|---|---|---|---|---|
| 6,314,565 | B1 * | 11/2001 | Kenner et al. ................. | 717/171 |
| 6,570,926 | B1 | 5/2003 | Agrawal et al. | |
| 2002/0120885 | A1 * | 8/2002 | Choi et al. ....................... | 714/38 |
| 2004/0083471 | A1 * | 4/2004 | Nam et al. ..................... | 717/168 |
| 2005/0108757 | A1 * | 5/2005 | Lee et al. ........................ | 725/50 |

FOREIGN PATENT DOCUMENTS

| | | |
|---|---|---|
| CN | 1754149 A | 3/2006 |
| EP | 0889645 A2 | 1/1999 |
| EP | 889645 A2 * | 1/1999 |
| EP | 0911728 A1 | 4/1999 |
| EP | 0993183 A2 | 4/2000 |
| EP | 993183 A2 * | 4/2000 |
| JP | 2000307658 A | 11/2000 |
| JP | 2002-149536 A | 5/2002 |
| JP | 2004-505376 A | 2/2004 |
| JP | 2006-050625 A | 2/2006 |
| KR | 10-1999-030113 A | 4/1999 |
| KR | 1020010044634 A | 6/2001 |
| KR | 1020010076449 A | 8/2001 |
| KR | 1020020054276 A | 7/2002 |

(Continued)

*Primary Examiner* — Chi Pham
*Assistant Examiner* — Kouroush Mohebbi
(74) *Attorney, Agent, or Firm* — Sughrue Mion, PLLC

(57) ABSTRACT

An apparatus, system, and method for upgrading to a new codec used in a digital broadcasting environment are provided. The apparatus includes a first transceiver that receives a transport stream; a first parser that parses the transport stream to determine a codec packet, and decodes codec information contained therein; and a codec-comparison unit that compares the decoded codec information with existing codec information, and determines whether a codec should be downloaded. The system includes a device manufacturer that manufactures a codec packet; a broadcaster that transmits a transport stream containing the codec packet; and a rendering device that parses the transport stream, compares existing codec information with new codec information, and upgrades a codec based on the comparison. The method includes receiving a transport stream; parsing the stream; decoding new codec information; comparing the new codec information with existing information; and upgrading the codec based on the new codec information.

14 Claims, 13 Drawing Sheets

FOREIGN PATENT DOCUMENTS

| | | |
|---|---|---|
| KR | 10-2004-0035337 A | 4/2004 |
| KR | 1020040065790 A | 7/2004 |
| KR | 10-2005-0063860 A | 6/2005 |
| KR | 10-2005-0096639 A | 10/2005 |
| WO | 02/10951 A2 | 2/2002 |
| WO | WO 03/051079 A1 | 6/2003 |
| WO | 2004/031949 A2 | 4/2004 |
| WO | WO 2004031949 A2 * | 4/2004 |

* cited by examiner

FIG. 1B (Related Art)

| STT { | TODAY | | 13:30 | | 14:00 | 14:30 | |
|---|---|---|---|---|---|---|---|
| | Prog 1 | NBC | ◀ Empty Nest | | Blossom | | ▶ |
| | Prog 2 | SBC | Twister | | | | ▶ |
| | Prog 3 | Warner | ◀ One life to live | General hospotal | | | ▶ |
| | Prog 4 | Fox | ◀ Greased | The mask | | so | ▶ |
| | Prog 5 | Fox | ◀ HO | Ricki Lake | | Jerry Spring | |
| | \_\_VCT\_\_ | | _____EIT_____ | | | | |

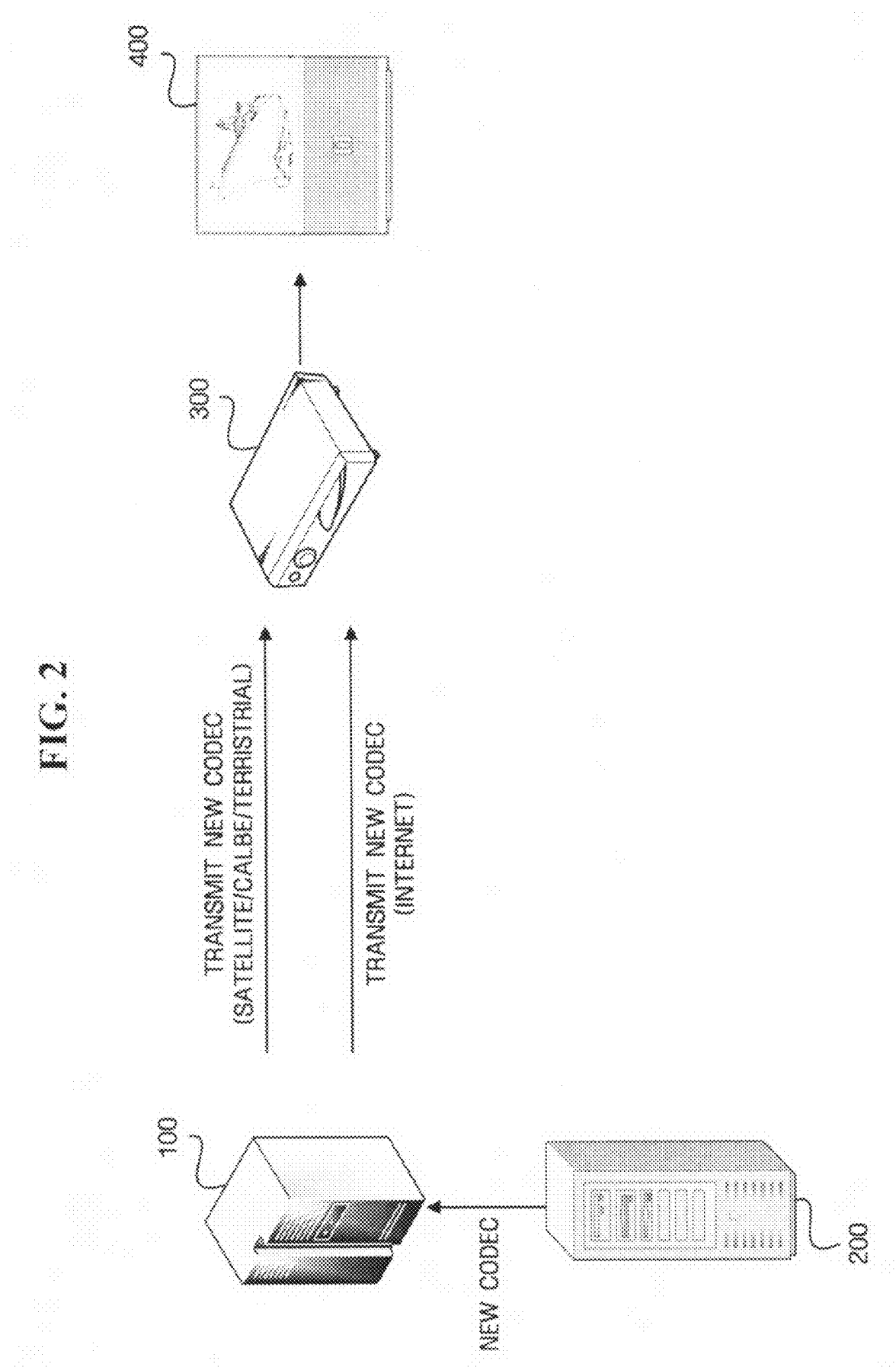

FIG. 8

| STT | TODAY | | 13:30 | 14:00 | 14:30 | |
|---|---|---|---|---|---|---|
| | Prog 1 | NBC | ◀ Empty Nest (MPEG2, HD) | Blossom (H.264, HD) | | ▶ |
| | Prog 2 | SBC | Twister (VC.1, HD) | | | ▶ |
| | Prog 3 | Warner | ◀ One life to live | General hospital (MPEG2, HD) | | ▶ |
| | Prog 4 | Fox | ◀ Greased | The mask (H.264, SD) | | so ▶ |
| | Prog 5 | Fox | ◀ HD | Ricki Lake (VC.1, SD) | Jerry Spring (H.264, HD) | ▶ |

VCT            EIT

BASIC SETTINGS: MPEG2, SD

APPARATUS AND METHOD FOR UPGRADING CODEC

CROSS-REFERENCE TO RELATED APPLICATION

This application claims priority from Korean Patent Application No. 10-2006-0040044 filed on May 3, 2006, in the Korean Intellectual Property Office, the disclosure of which is incorporated herein in its entirety by reference.

BACKGROUND OF THE INVENTION

1. Field of the Invention

Apparatuses, systems, and methods consistent with the present invention relate to upgrading a codec, and more particularly, to upgrading to a new codec used in a digital broadcasting environment, and providing codec information for content information such as an electronic program guide (EPG).

2. Description of the Related Art

With the recent introduction of new digital broadcasting environments, such as Internet Protocol (IP) televisions (TVs) and satellite broadcasting, services are now provided using a variety of codecs.

In addition, TV stations are making efforts to transmit higher quality pictures. However, commercial TVs have a built-in MPEG-2 codec, and thus do not support various additional formats.

Broadcasting systems that execute related art software upgrades include device manufacturers, broadcasters (e.g., MBC, KBS, and SBS), and source devices receiving broadcasting signals such as set-top boxes (STBs) or personal computers (PCs). A related art software upgrade procedure will now be described.

First, the device manufacturers provide the broadcasters with new software. The broadcasters include the provided software in service information (SI) or program service information (PSI), and send the provided software to the set-top box or PC via broadcasting channels.

Next, the set-top box compares the version of the new software to that of the existing software. If it is determined that an upgrade is needed, the set-top box replaces the existing software with the new software, modifies the version number, and reboots in order to execute the new software.

Thus, upgraded software may be periodically downloaded. However, in order to play a predetermined program, codecs must be downloaded prior to the broadcast time.

In addition, since only the software with respect to a predetermined device or devices is downloaded, it is impossible for devices without a remote access interface (e.g., a tuner and the Internet) to upgrade the software.

FIG. 1A illustrates structures of a program association tale (PAT) or a program map table (PMT) included in the PSI received from broadcasters according to the related art.

As illustrated in FIG. 1A, a transport stream (hereinafter, referred to as "MPEG2-TS") consists of a transport packet having a fixed size of 188 bytes. The transport packet consists of a 4-byte packet header and a 184-byte data area (i.e., a payload). The packet header includes 8-bit sync information and a 13-bit binary packet identifier (PID).

SI data is service information on programs that includes additional service information such as channel information, and currently aired service and event information.

PSI data is used for easy selection of the program in a receiver. The PSI includes the transport packet containing a PAT, a PMT, or a network information table (NIT)

In the new digital system (NDS)-satellite broadcasting system, software can be upgraded by defining a code download table (CDT) within the PMP and receiving a corresponding table. In a CDT software descriptor, software types (e.g., application software (SW), codecs, and firmware) can be defined and codecs can be received. In an advanced television system committee (ATSC) and the cable broadcasting system, the software may be downloaded based on a digital storage command and control (DSMCC) protocol. The codecs may be downloaded using the same.

In the PAT, PID=0 is fixedly allocated according to the MPEG-2 standard. In addition, all programs that have been time-division multiplexed have their own program number as program-identifying information. The program number may be randomly selected by broadcasters.

For example, a receiver parses a packet header of a transmitted transport stream and if PID=0, PAT information is included in the data area. The number of a program to be played (e.g., program 3) and the corresponding PID can be identified via the PAT.

When playing program 3, the program 3 PID (e.g., 1127) is checked and a transport stream having a PID of 1127 is read from the received transport stream.

When a stream having a PID of 1127 is received, PMT information included in the data area is read, the PID in the PMT is checked, and desired data (e.g., video and audio data) is downloaded. The PMP of each program contains the program number of the program and the PID of the transport packet containing the program's video and audio information.

Furthermore, a stream type in the PMT is checked and a codec used by the corresponding stream type can be identified. For example, referring to FIG. 1A, the video in program 3 is in MPEG-2 format (ISO/IEC 13818-2).

FIG. 1B illustrates an EPG in a related art broadcasting system.

A set-top box receives program and system information protocol (PSIP) from broadcasters, and creates an EPG by mapping information such as a system time table (STT), a master guide table (MGT), a virtual channel table (VCT), a rating region table (RRT), an event information table (EIT), and an extended text table (ETT).

That is, as illustrated in FIG. 1B, information on programs is provided in columns, and information on broadcast time and program titles is provided in rows. For example, "One Life to Live" is highlighted in the EPG.

Japanese Unexamined Publication No. 2002-149536 (Communication Terminal Device, Program Updating Method, and Storage Medium) discloses an apparatus for upgrading the firmware of a video codec or an audio codec, wherein a user makes a request to a firmware upgrade server and ensures that the connection with the server has been established, video channels, audio channels, and data channels are opened, and new firmware is received from the server and stored in a random access memory (RAM). A system controller closes the video and audio channels, updates the firmware area for the video codec and the audio codec of a flash memory, uses the updated video and audio codecs, opens the video and audio channels, and displays them. That is, for example, a client has a video conference with someone in a service center receiving information on an upgrade, and makes a request for the upgrade by selecting a video-codec-upgrade menu. However, the none of the above systems, apparatuses, or methods disclose a technique to guarantee quality of service (QoS) by receiving new codecs via the broadcasting channels, and to update the codecs without menu selections.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

It is an object of the present invention to replace an existing codec with a new codec when the new codec is received by a renderer in a digital broadcasting environment.

Another object of the present invention is to execute a codec upgrade by receiving a new codec via a network interface unit in a home network environment, and to transmit the new codec to a corresponding device.

According to an aspect of the present invention, there is provided an apparatus for upgrading a codec, the apparatus including a first transceiver that receives a transport stream from a broadcaster; a first parser that parses the transport stream to determine a codec packet included in the transport stream, and decodes codec information contained therein; and a codec-comparison unit that compares the decoded codec information with existing codec information that has been stored, and determines whether a codec should be downloaded.

According to another aspect of the present invention, there is provided a system for upgrading a codec, the system including a device manufacturer that manufactures a new codec packet with respect to a device; a broadcaster that transmits a transport stream comprising the new codec packet; and a rendering device that parses the transport stream to determine the new codec packet included in the transport stream, compares existing codec information with new codec information contained in the new codec packet, and upgrades to a new codec transmitted from the broadcaster based on the new codec information.

According to still another aspect of the present invention, there is provided a method of upgrading a codec, the method including receiving a transport stream transmitted from a broadcaster; parsing the transport stream to determine a codec packet included in the received transport stream; decoding new codec information contained in the codec packet; comparing the new codec information that has been decoded with existing codec information; and upgrading to a new codec when the new codec information is higher than the existing codec information.

BRIEF DESCRIPTION OF THE DRAWINGS

The above and other aspects of the present invention will become apparent by describing in detail exemplary embodiments thereof with reference to the attached drawings, in which:

FIG. 1B illustrates an EPG in a related art broadcasting system;

FIG. 2 illustrates a system including an apparatus for upgrading a codec according to an exemplary embodiment of the present invention;

FIG. 8 is a screen display of an EPG with provided codec information on a program based on FIG. 7;

DETAILED DESCRIPTION OF THE INVENTION

Figure 1A:
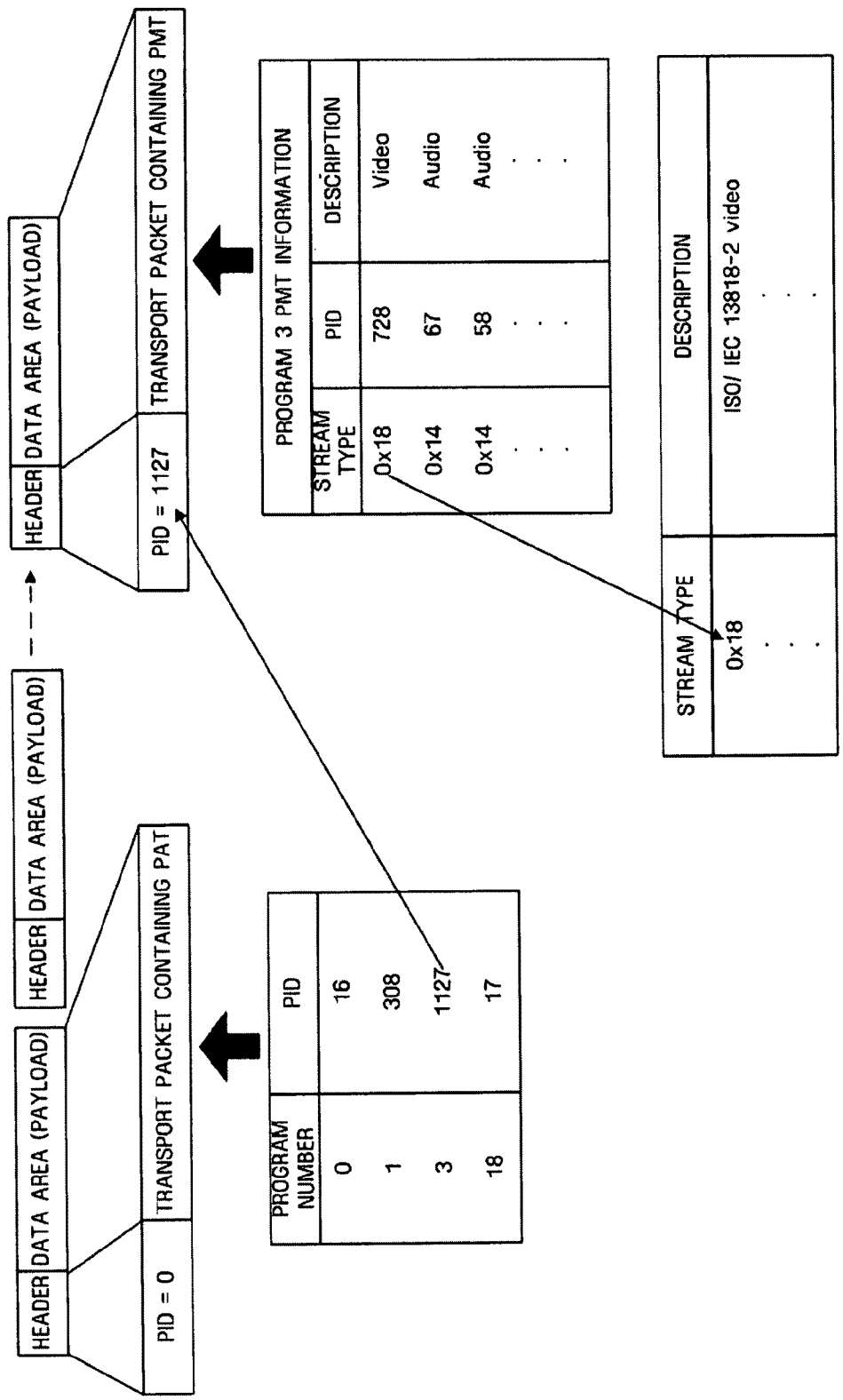
FIG. 1A illustrates structures of a PAT or PMT included in PSI received from related art broadcasters.

Exemplary embodiments of the present invention will be described in detail with reference to the accompanying drawings.

Advantages and features of the present invention and methods of accomplishing the same may be understood more readily by reference to the following detailed description of the exemplary embodiments and the accompanying drawings. The present inventive concept may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Exemplary embodiments of the present invention are also described hereinafter with reference to flowchart illustrations of user interfaces, methods, and computer program products.

FIG. 2 illustrates a system including an apparatus for upgrading a codec according to an exemplary embodiment of the present invention.

Referring to FIG. 2, the system executing a codec upgrade includes a broadcaster 100, a device manufacturer 200, a transceiver 300, and a render device 400.

First, the device manufacturer 200 manufactures a new codec and provides the new codec to the broadcaster 100. A detailed description of a format of a codec packet containing codec data will be given below with reference to FIG. 6.

The broadcaster 100 transmits a codec packet containing new codec information to the transceiver 300 using the PSI. The transceiver 300 receives broadcasting signals. The transceiver 300 may be a set-top box, a projector, or may be incorporated into a TV. In addition, the broadcaster 100 may transmit the new codec to the transceiver 300 via the Internet.

The transceiver 300 (e.g., a set-top box) transmits the received codec packet to a rendering device 400. The rendering device 400 (or a sink device) parses the codec packet received from the transceiver 300, determines whether a codec should be upgraded, and executes the upgrade. The rendering device may be a digital television (DTV), a monitor, or other similar device.

The rendering device 400 (e.g., a DTV) parses the received codec packet, compares information on the parsed codec (e.g., a version number) with information on a codec that has been stored in a storage unit. If it is determined that the newly received codec should be upgraded, the existing codec is replaced by the new codec.

The rendering device 400 may also incorporate the transceiver 300. In such a case, receiving the codec packet from the transceiver may be skipped. Hereinafter, the rendering device (e.g., a DTV) will be described below in more detail with reference to FIG. 4.

Figure 3:
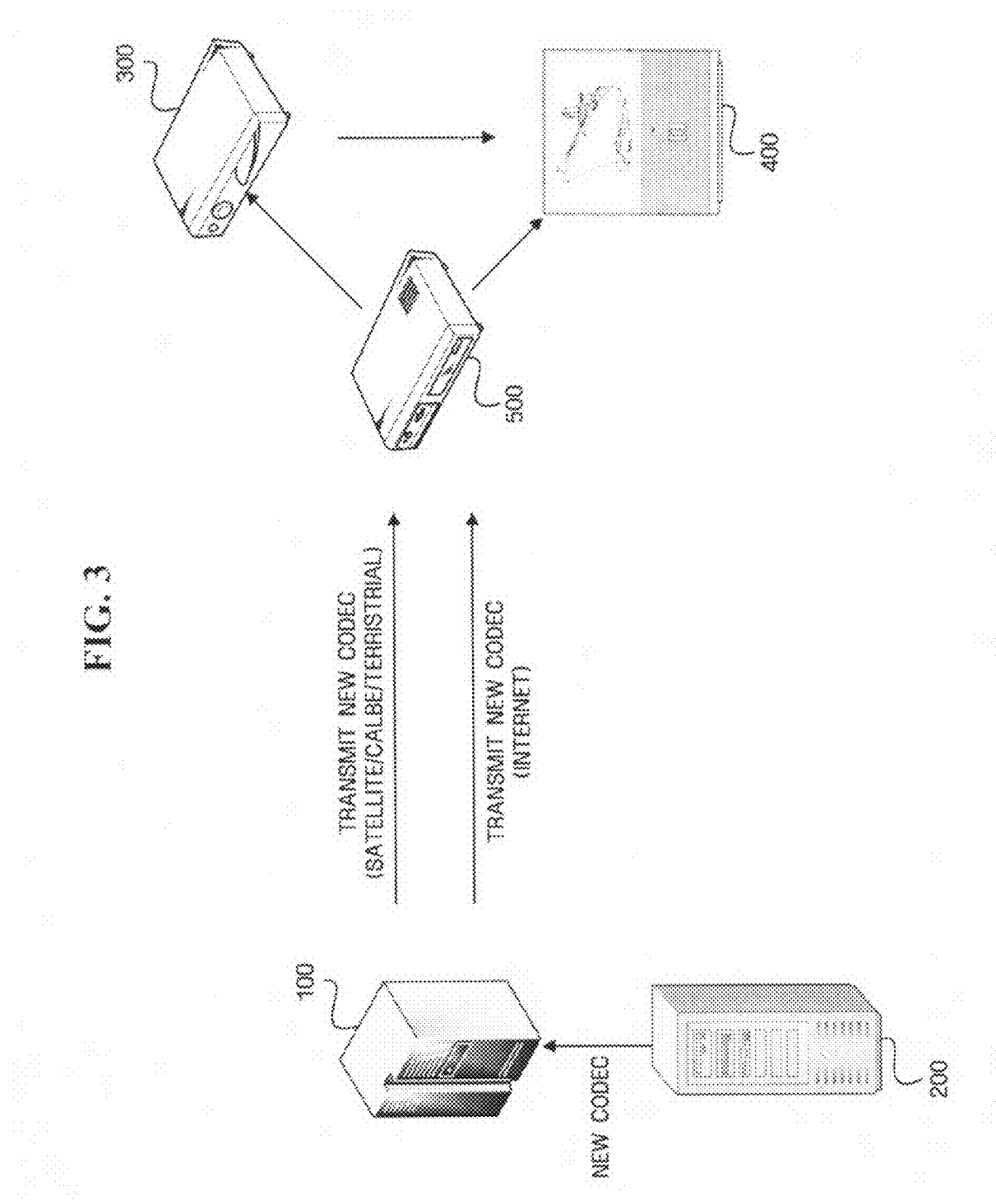
FIG. 3 illustrates a system including an apparatus for upgrading a codec according to another exemplary embodiment of the present invention.

FIG. 3 illustrates a system including an apparatus for upgrading a codec according to another exemplary embodiment of the present invention.

Referring to FIG. 3, the system that upgrades the codec includes a broadcaster 100, a device manufacturer 200, a transceiver 300, a rendering device 400, and a network-interface unit 500. The apparatus herein has the same elements as the apparatus upgrading the codec described with reference to FIG. 2 except that the apparatus herein further includes the network-interface unit 500. Therefore, an operation of the network-interface unit 500 will be described hereinafter.

The network-interface unit 500 is a full-duplex broadcasting receiver, e.g., a set-top box or a computer. It may also be incorporated into a TV. The network interface unit 500 also incorporates a memory card, and can be additionally provided according to a receiving method, e.g., terrestrial, satellite, or cable.

The network-interface unit 500 receives codec information on the apparatuses in a home network that may be unable to receive transmitted signals from an external network, and transmits the codec information to the corresponding apparatus so the apparatus can upgrade a codec.

The network-interface unit 500 receives a codec packet from the broadcaster 100, parses the received codec packet to find a header of the received codec packet, and detects an apparatus that needs to download the corresponding codec. Then, the network-interface unit 500 transmits the codec packet to the detected apparatus, for example a rendering device 400 such as a DTV or a transceiver unit 300.

In addition to the network-interface unit 500, the transceiver 300 can receive the codec packet, and transmit the received codec packet to the rendering device 400.

The rendering device 400 parses the codec packet transmitted from the network-interface unit 500 (or alternatively from set-top box 300), compares the parsed codec information to existing codec information, and determines whether the corresponding codec should be upgraded. The network-interface unit 500 will be described later with reference to FIG. 5.

Figure 4:
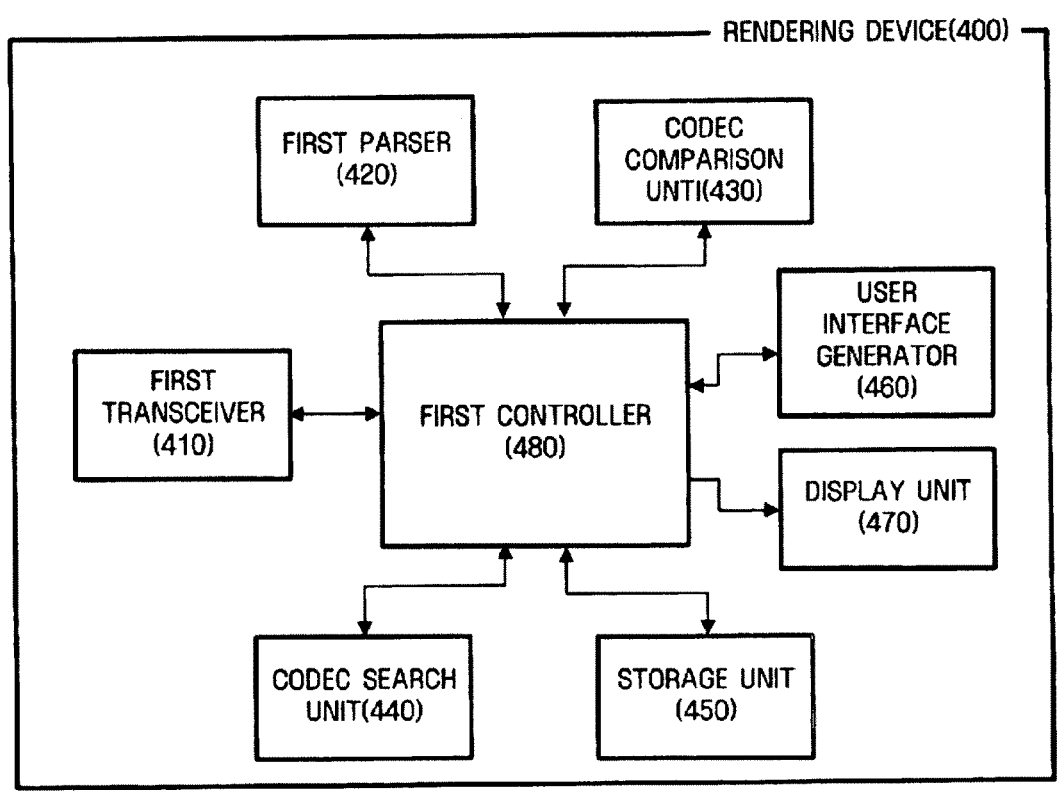
FIG. 4 is an internal flow chart of a rendering device that executes a codec upgrade according to another exemplary embodiment of the present invention.

FIG. 4 is an internal flow chart of a rendering device that executes a codec upgrade according to another exemplary embodiment of the present invention.

Referring to FIG. 4, a rendering device 400 includes a first transceiver 410, a first parser 420, a codec-comparison unit 430, a codec-search unit 440, a storage unit 450, a user-interface generator 460, display unit 470, and a first controller 480.

The term "unit" denotes, but is not limited to, a software or hardware component, such as a Field Programmable Gate Array (FPGA) or an Application Specific Integrated Circuit (ASIC), which executes certain tasks. A unit may advantageously be configured to reside in the addressable storage medium, and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units.

The first transceiver 410 receives the PSI and PSIP transmitted from the broadcaster 100, and transmits a codec-request message requesting transfer of a codec to the broadcaster 100 in an external network. The codec may be predetermined.

If the rendering device 400 does not have a built-in set-top box, the set-top box 300 and the network-interface unit 500 receive the PSI and PSIP transmitted from the broadcaster 100, and transmit the received signals to the rendering device 400. If the rendering device 400 has a built-in set-top box, it can receive the PSI and PSIP directly from the broadcaster 100.

The first parser 420 parses the PSI and PSIP input by the first transceiver 410. That is, the first parser 420 parses the PSI, and can receive information on an apparatus stored in the header of the codec packet and a program. The apparatus may be predetermined and the program may be predetermined. In addition, the first parser 420 parses the PSIP and provides information on the generation of an EPG.

The codec-comparison unit 430 compares the codec information (e.g., version information) parsed by the first parser 420 with existing version information stored in the storage unit 450, and determines whether a codec should be updated.

For example, if the new codec is of a higher version than the existing codec, the codec is upgraded.

The codec-search unit 440 searches for a codec that drives (i.e., is used with) the corresponding program when a channel is switched in the rendering device 400. Once a suitable codec is found, the first controller 480 requests the broadcaster 100 in the external network to download the corresponding codec based on the search result carried out by the codec-search unit 440.

In addition, the codec-search unit 440 searches for a stream type, and codec information with respect to a program in the virtual channel table (VCT) and PMT parsed by the first parser 420.

For example, the stream type is checked in the VCT and a stream type that matches the checked stream type in the PMT.

Then, the codec-search unit 440 searches for codec information with respect to the stream typed searched in the PMT. Codec search information will be described in detail later with reference to FIG. 7.

The storage unit 450 stores a codec, codec information, broadcasting content, and EPG information.

The user interface generator 460 generates an EPG screen including the broadcasting content and codec information.

For example, based on the stream type and codec information included in the PMT and VCT of the PSI and PSIP, the user interface generator 460 generates the title of the program and information corresponding thereto, and provides the information to the EPG screen. The codec information search and the EPG screen will be described in detail later with reference to FIGS. 7 and 8.

The display unit 470 displays the broadcasting content transmitted from the broadcaster 100 and the EPG screen included in the codec information generated by the user interface generator 460.

The first controller 480 generates and transmits a codec-request message requesting the broadcaster 100 in the external network to transmit a codec if the codec is needed to reproduce broadcasting content. The codec may be predetermined, and the broadcasting content may be predetermined.

In addition, the first controller 480 controls the operations of functional blocks 410 through 470 that comprise the rendering device 400.

Figure 5:
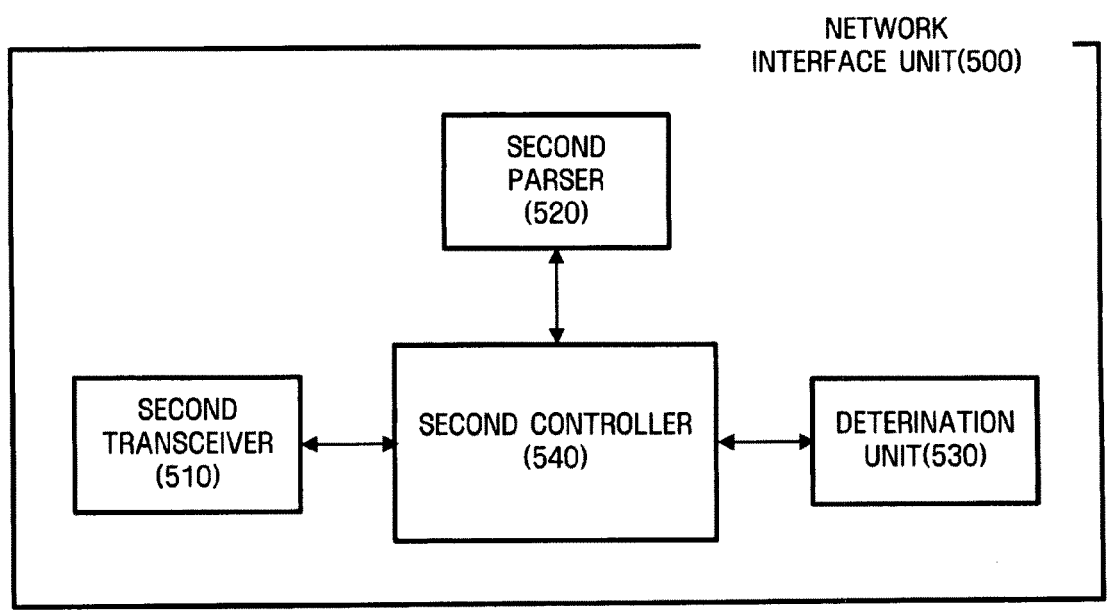
FIG. 5 is a block diagram illustrating a network-interface unit that upgrades a codec according to a further exemplary embodiment of the present invention.

FIG. 5 is a block diagram illustrating a network-interface unit that upgrades a codec according to a further exemplary embodiment of the present invention.

Referring to FIG. 5, the network-interface unit 500 includes a second transceiver 510, a second parser 520, a determination unit 530, and a second controller 540.

The second transceiver 510 receives PSI from a broadcaster 100, and transmits a codec-request message requesting the broadcaster 100 in an external network to transmit a codec. The codec may be predetermined.

In addition, the second transceiver 510 transmits the codec packet to a device, which may be predetermined, and receives the codec-request message from the device.

The second parser 520 parses the PSI input via the second transceiver 510, and can obtain information on the device stored in a header of the codec packet.

The determination unit 530 determines a device that is supposed to receive the codec packet based on the information on the device parsed by the second parser 520.

The second controller 540 controls the operations of functional blocks 510 through 530 that compose the network-interface unit 500.

Figure 6:
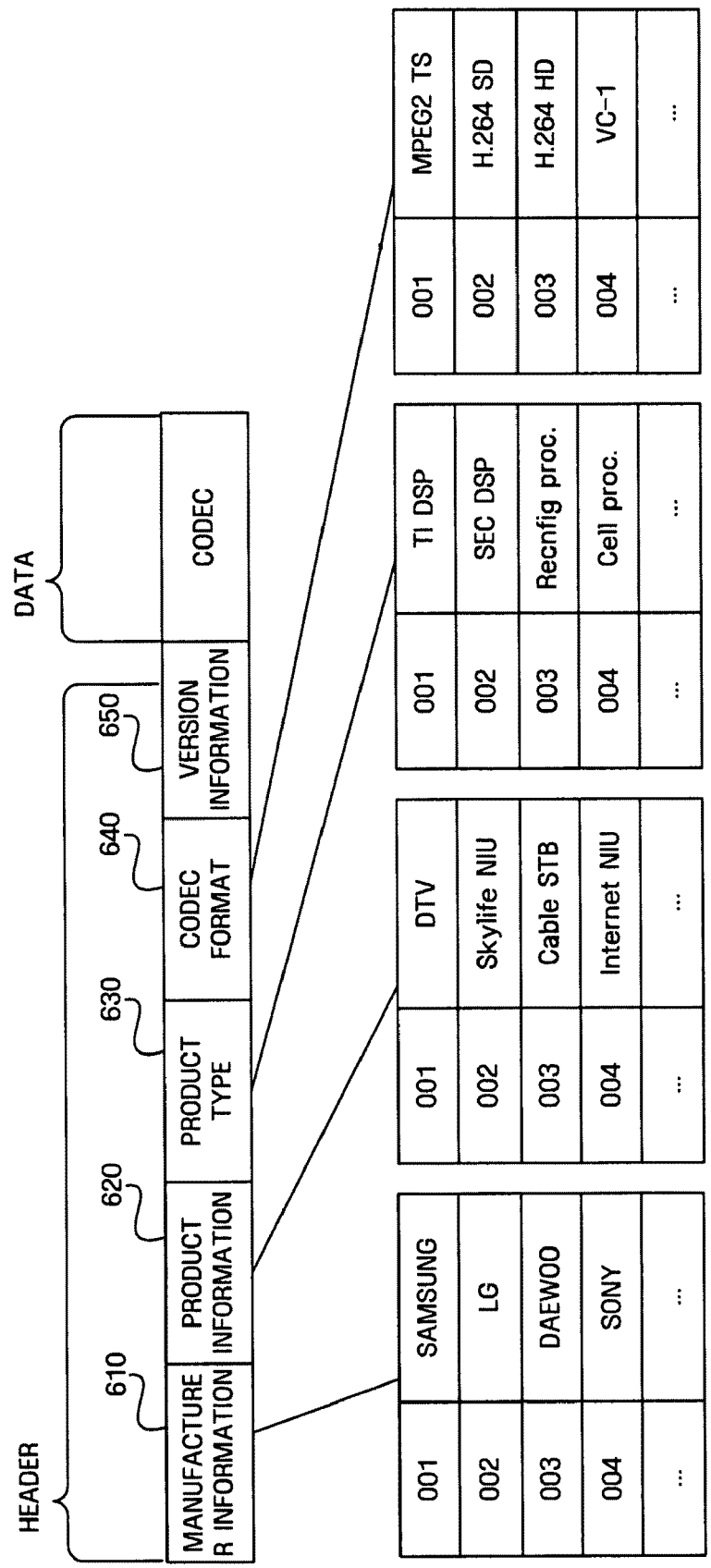
FIG. 6 illustrates formatting a codec packet received by an apparatus that upgrades the codec according to a further exemplary embodiment of the present invention.

FIG. 6 illustrates formatting a codec packet received by an apparatus that upgrades codec according to a further exemplary embodiment of the present invention.

Referring to FIG. 6, a codec packet comprises a header and data. The header includes manufacturer information 610, product information 620, product type 630, codec format 640, and version information 650.

For example, when the codec packet transmitted from a broadcaster 100 is received, a network-interface unit 500 extracts the header of the codec packet, and parses the manufacturer and product information.

When the codec packet is for a Samsung DTV, the network-interface unit 500 transmits the codec packet to the corresponding device, i.e., a Samsung DTV.

The rendering device 400 extracts the header from the codec packet transmitted from the network-interface unit 500, and parses the codec information. Version information on the parsed codec is compared with version information about an existing codec, and it is determined whether to download the new codec.

The DTV 400 may receive the codec packet from a set-top box 300.

Figure 7:
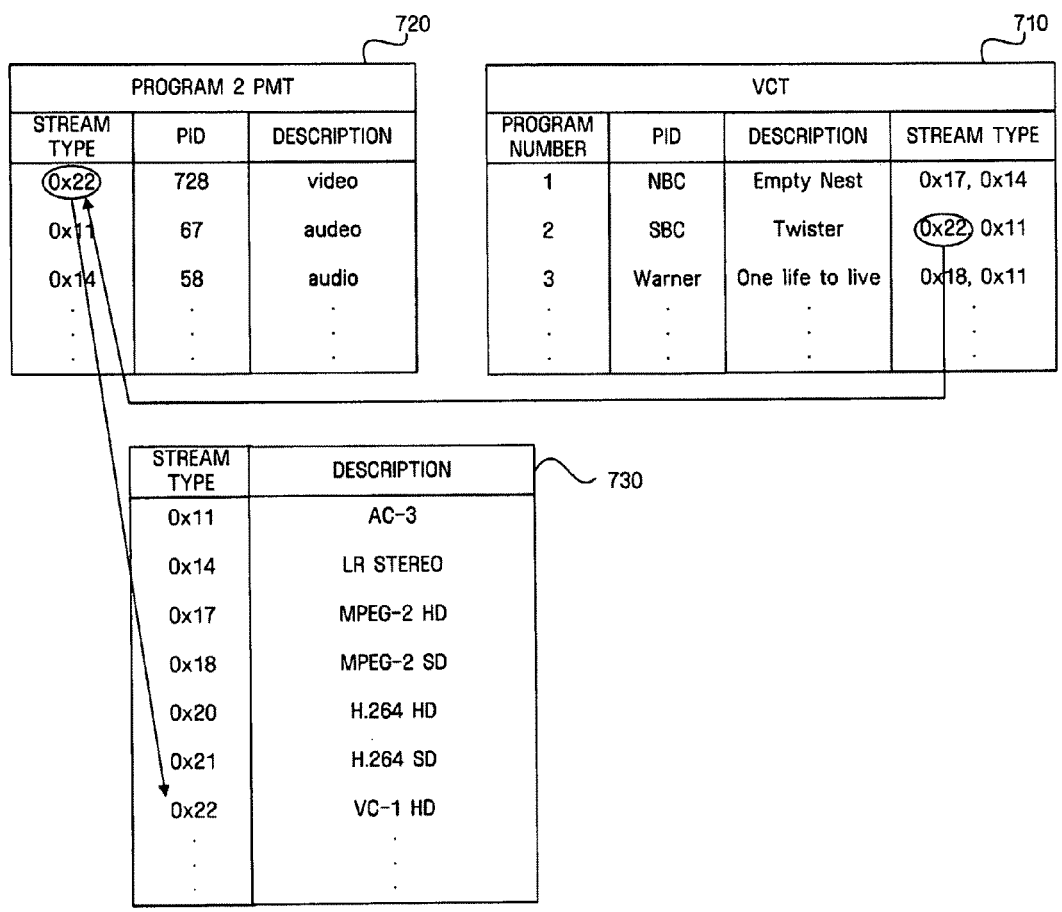
FIG. 7 is a process of searching for codec information on a program in an apparatus for upgrading a codec according to a further exemplary embodiment of the present invention.

FIG. 7 is a process of searching for codec information on a program in an apparatus for upgrading a codec according to a further exemplary embodiment of the present invention. A virtual channel table (VCT) 710 containing virtual channel information (e.g., a program title, a program physical transmission channel (PTC) number, and a stream type) matches a stream type included in a PMT 720.

Referring to FIG. 7, when the VCT 710 and PMT 720 are transmitted via the PSIP and PSI, the stream type of a program is checked in the VCT 710, and a stream type identical to the checked stream type is searched for in the PMT 720.

For example, program 2 stream type (e.g., 0x22) is checked, and the stream type checked in the PMT 720 (e.g., 0x22) is searched for.

Then, codec information on the stream type (e.g., 0x22) is searched for in a table 730 storing the codec information.

Therefore, the codec information on program 2 is VC-1 and HD. The title of the program 2 (e.g., Twister) and the codec information (e.g., VC-1 HD) are then provided in an EPG.

FIG. 8 is a screen display of an EPG with provided codec information on a program based on FIG. 7.

Referring to FIG. 8, program information is provided in rows and broadcast times and program titles are provided in columns.

That is, a first parser 420 parses a system time table (STT) providing information on a current date and time, a virtual channel table (VCT) containing information on virtual channels (e.g., program titles, program PTC numbers, and stream types), and an event information table (EIT) providing information on programs on all channels in the VCT within a 3-hour time frame by parsing PSIP transmitted from a broadcaster 100. A user-interface generator 460 generates an EPG based on the parsed information.

In addition, information on a codec that can play the corresponding program is provided in the EIT. Further, if nothing else is provide in the EPG other than the program title, i.e., if the codec information is not provided, the corresponding program is played in a default codec and resolution (e.g., MPEGS and SD).

For example, on program 4, the movie, "The Mask" is played from 1:20 to 2:20 using H.264 in standard definition (SD) format.

If a codec playing a program exists in a rendering device 400, the program title and the codec information are displayed in a darker font on the EPG. Otherwise, the program title and the codec information are displayed in a lighter font. Accordingly, a user can see whether the corresponding codec exists.

Figure 9:
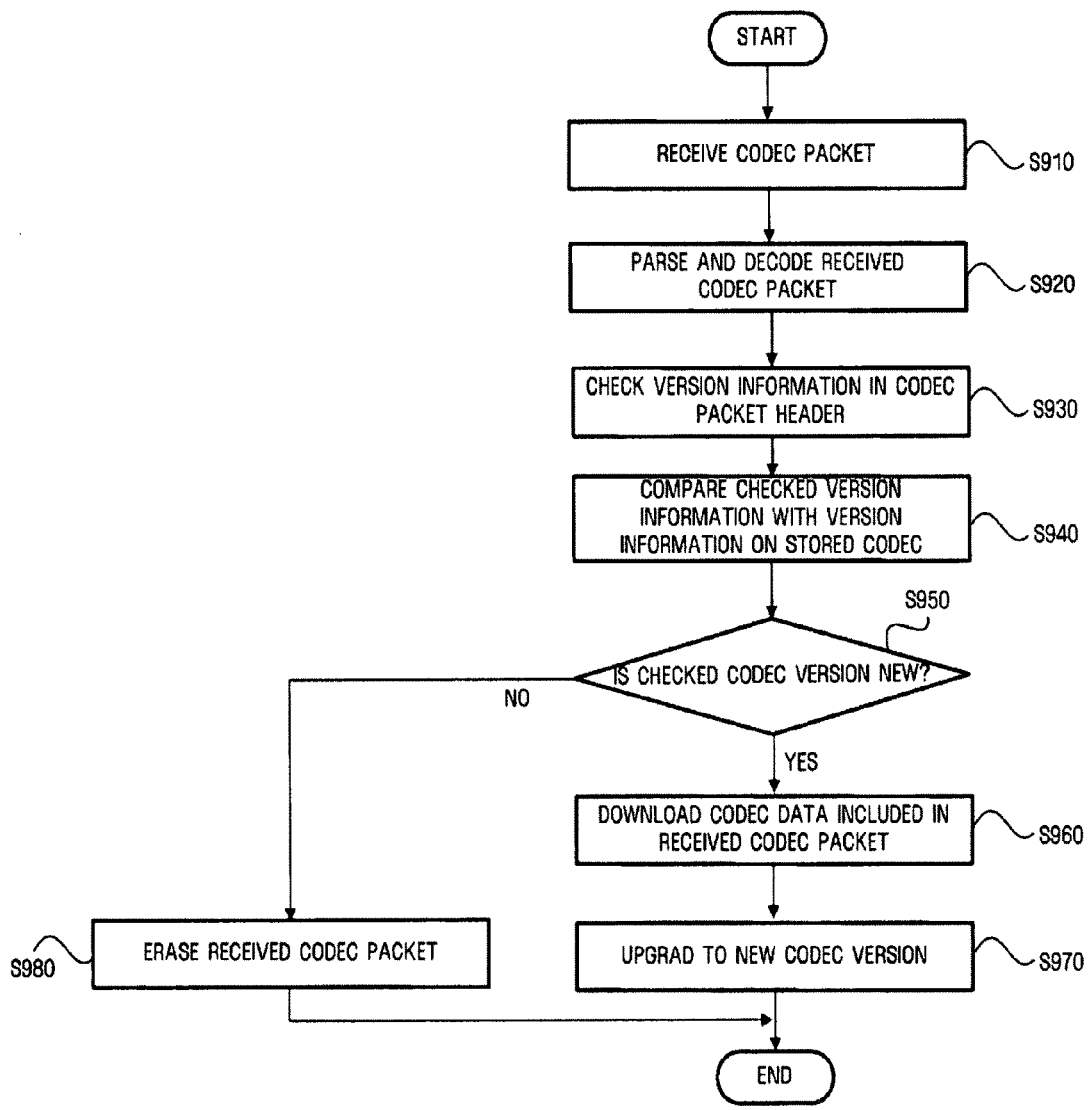
FIG. 9 illustrates a method of upgrading a codec according to a further exemplary embodiment of the present invention.

FIG. 9 illustrates a method of upgrading a codec according to a further exemplary embodiment of the present invention.

First, a manufacturer 200 manufactures a new codec, and transmits it to a broadcaster 100. The broadcaster 100 transmits a codec packet containing new codec data to a transceiver (e.g., a set-top box) using PSI. The transceiver transmits the received codec packet to a rendering device, as is described above.

Then, a first transceiver 410 of the rendering device 400 receives the transmitted codec from the set-top box (operation S910) and a first parser 420 parses the received codec, and decodes codec information (e.g., version information) (operation S920).

Then, a codec-comparison unit 430 compares the decoded codec version with the version of a codec stored in a storage unit 450 (operation S930 and S940). It is determined if the decoded version number is a new version. (operation S950). If it is determined that the newly received codec should be upgraded, a first controller 480 stores codec data included in the codec packet in the storage unit 450, and the rendering device 400 is upgraded to a new codec (operation S970).

Conversely, if it is determined that the codec does not need be upgraded in operation S950, the first controller 480 discards the received codec packet (operation S980).

Figure 10:
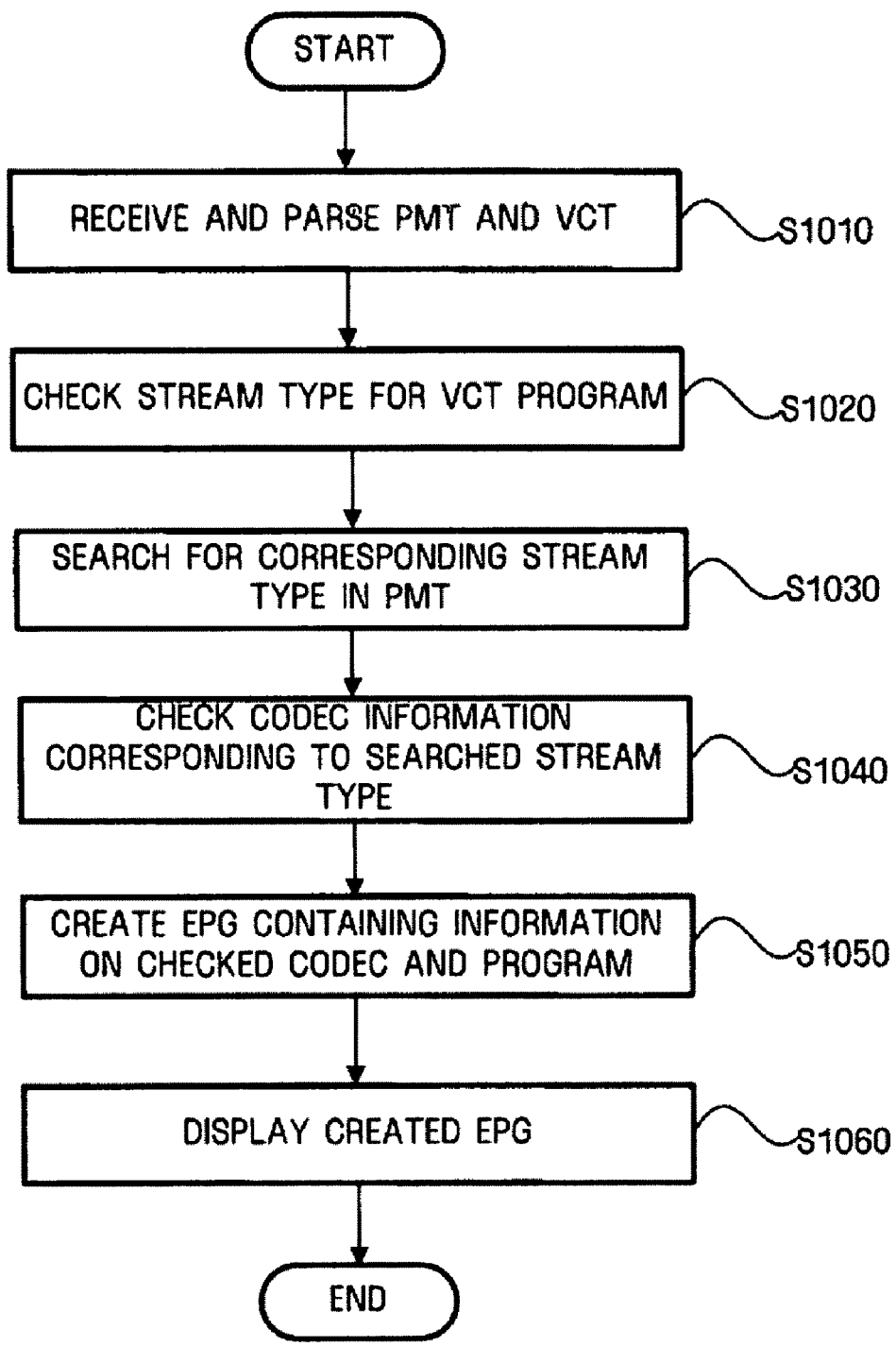
FIG. 10 illustrates displaying an EPG screen containing codec information when upgrading a codec according to a further exemplary embodiment of the present invention.

FIG. 10 illustrates displaying an EPG screen containing codec information for upgrading a codec according to a further exemplary embodiment of the present invention.

A first transceiver 410 receives a VCT and a PMT included in PSIP and PSI and a first parser 420 parses the VCT and PMT (operation S1010).

A codec-search unit 440 checks a stream type with respect to a program in the VCT (operation S1020), and searches for the same stream type as the checked stream type in the PMT (operation S1030).

The codec-search unit 440 checks codec information corresponding to the searched stream type in a table storing the codec information (operation S1040). A user-interface generator 460 generates an EPG containing program information included in the checked codec information and the VCT (operation S1050). The generated EPG is displayed via a display unit 470 (operation S1060).

Figure 11:
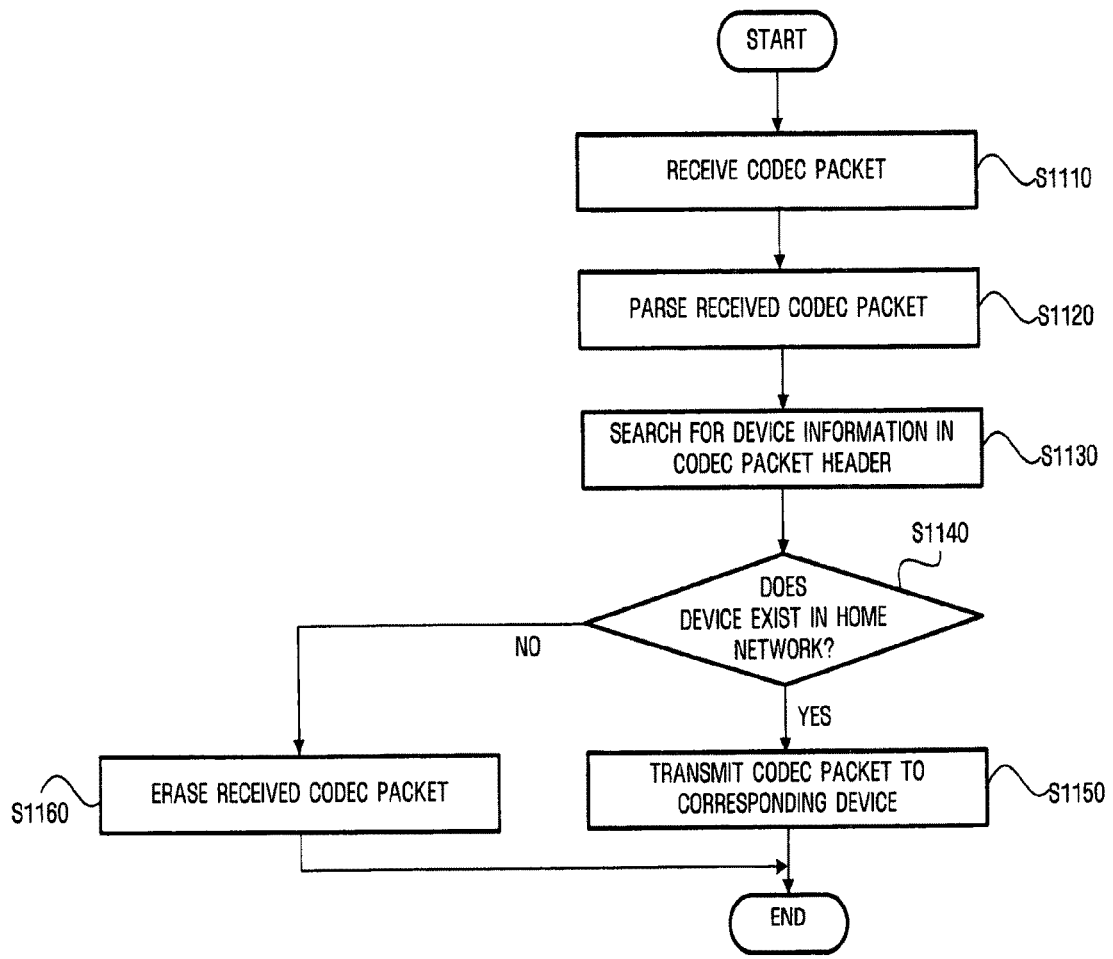
FIG. 11 illustrates the receiving and processing of a codec packet by a network-interface unit when upgrading a codec according to a further exemplary embodiment of the present invention.

FIG. 11 illustrates that a network-interface unit receives and processes a codec packet when upgrading a codec according to a further exemplary embodiment of the present invention. Updating a codec in a home network environment will be described as an example.

A device manufacturer 200 manufactures a new codec and transmits it to a broadcaster 100. The broadcaster 100 transmits a codec packet containing new codec data using the PSI. A second transceiver 510 of the network-interface unit 500 receives the transmitted codec packet (operation S1110).

A second parser parses the received codec packet (operation S1120), and searches for information on the device in the header of the codec packet (operation S1130).

A determination unit 530 checks whether the searched information on the device exists in the home network, and the corresponding device exists in the home network (operation S1140). If it is determined that the device exists in the home network, a second controller 540 transmits the codec packet via the second transceiver 510 to the device (operation S1150).

If the corresponding device does not exist in the home network in operation S1140, the second controller 540 discards the received codec packet (operation S1160).

Accordingly, devices that are unable to receive the signals transmitted from the external network in the home network are upgraded to a new codec.

Figure 12:
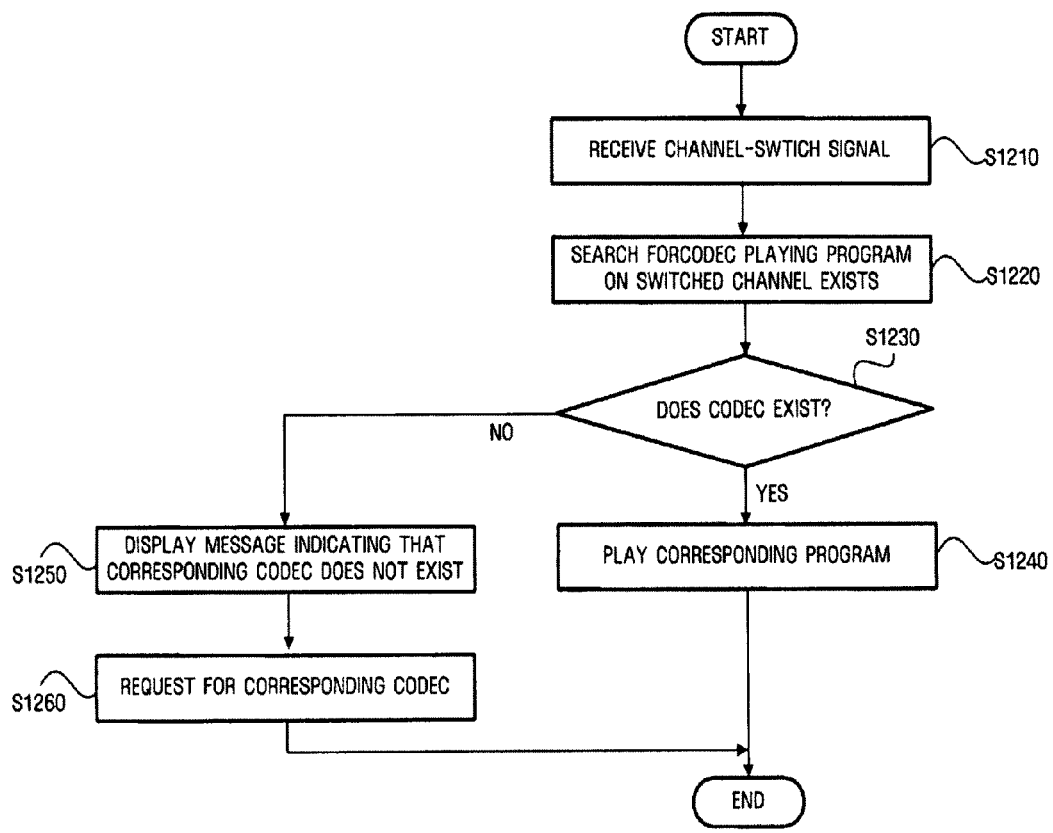
FIG. 12 illustrates operations carried out when a channel is switched when upgrading a codec according to a further exemplary embodiment of the present invention.

FIG. 12 illustrates operations carried out when a channel is switched when upgrading a codec according to a further exemplary embodiment of the present invention.

When a channel is switched to (operation S1210), a codec-search unit 440 searches for a codec that drives the program which has been switched to in a storage unit 450 (operation S1220).

It is determined if the codec exists (operation S1230). If the codec exists in the storage unit 450, a first controller 480 plays the checked program using the codec corresponding thereto (operation S1240).

However, if the codec does not exist in the storage unit 450, the first controller 480 displays, via a display unit 470, a message indicating that the codec playing the program does not exist (operation S1250), and another message asking if the user wishes to download the corresponding codec on the screen.

If the user requests a codec download, the first controller 480 creates a message requesting download of a codec, and transmits the message to a broadcaster 100 via a first transceiver 410 (operation S1260).

As described above, according to exemplary embodiments of the present invention, when a new codec is received via a rendering device in a digital broadcasting environment where different codecs are used, and compared with an existing codec, the rendering device can immediately receive the new codec.

Moreover, devices unable to receive signals transmitted from an external network can upgrade a codec by receiving the new codec via a network-interface unit and transmitting them to the corresponding devices.

Content in a new format can be provided to a user by upgrading their devices to a new codec.

The present inventive concept as described above may be applied to embedded products having small computational performance by immediately downloading a codec whenever needed.

Furthermore, a user is provided with codec information by displaying codec information on programs in an EPG in a digital broadcasting environment where different codecs are used.

Exemplary embodiments of the present invention have been explained with reference to the accompanying drawings, but it will be apparent to those skilled in the art that various modifications and changes may be made thereto without departing from the scope and spirit of the invention. Therefore, it should be understood that the above exemplary embodiments are not restrictive but illustrative in all aspects.

What is claimed is:

1. An apparatus for upgrading a codec, the apparatus comprising:
    a first transceiver that receives a transport stream from a broadcaster;
    a first parser that parses a codec packet included in the transport stream, and decodes codec information contained therein; and
    a codec-comparison unit that compares the decoded codec information with existing codec information that has been stored, and determines whether a codec should be downloaded,
    wherein the first transceiver transmits a codec request message requesting the broadcaster to transfer the codec, and
    the apparatus further comprising a codec-search unit that searches for a codec which drives a channel when the channel is switched to; and
    a controller that creates the codec request message if the codec which is searched for does not exist,
    wherein information regarding the apparatus is contained in a header of the codec packet.

2. The apparatus of claim 1, wherein:
    the codec-search unit searches for a stream type with respect to a program and corresponding codec information in the transport stream transmitted from the broadcaster; and
    the apparatus further comprises a user-interface generator that displays the corresponding codec information about the program on an electronic program guide based on the corresponding codec information.

3. The apparatus of claim 2, wherein the displayed corresponding codec information comprises a corresponding name of a format of the codec.

4. The apparatus of claim 1, wherein the codec packet comprises manufacturer information, product information, a product type, codec format, and version information.

5. The apparatus of claim 1, wherein the transport stream transmitted from the broadcaster comprises at least one of program service information (PSI) and program and system information protocol (PSIP).

6. A system for upgrading a codec, the system comprising:
    a device manufacturer that manufactures a new codec packet with respect to a device;
    a broadcaster that transmits a transport stream comprising the new codec packet;
    a network-interface unit that receives the new codec packet transmitted from the broadcaster, checks a rendering device that will receive the new codec packet, and transmits the new codec packet to the rendering device, wherein the rendering device parses the new codec packet included in the transport stream, compares existing codec information with new codec information contained in the new codec packet, and upgrades to a new codec transmitted from the broadcaster based on the new codec information, wherein the rendering device comprises:

a first transceiver that receives the transport stream from the broadcaster;

a first parser that parses the new codec packet included in the transport stream; and decodes the new codec information contained therein;

a codec-comparison unit that compares the decoded new codec information with the existing codec information that has been stored, and determines whether the new codec should be downloaded;

a codec-search unit that searches for a codec which drives a channel when the channel is switched to;

a controller that creates a codec request message if the codec which is searched for does not exist, wherein the first transceiver transmits the codec request message requesting the broadcaster to transfer the new codec, and wherein information regarding the rendering device is contained in a header of the codec packet.

7. The system of claim 6, wherein the network-interface unit comprises:

a second transceiver that receives a transport stream transmitted from the broadcaster, and transmits the codec packet to a device in a home network;

a second parser that parses the codec packet included in the transport stream, and decodes codec information contained in a header of the codec packet; and a determination unit that determines a device that will receive the codec packet.

8. The system of claim 6, wherein the codec packet comprises manufacturer information, product information, a product type, a codec format, and version information.

9. The system of claim 6, wherein the transport stream transmitted from the broadcaster comprises at least one of program service information (PSI) and program and system information protocol (PSIP).

10. A method of upgrading a codec, the method comprising:

receiving a transport stream transmitted from a broadcaster;

parsing a codec packet included in the received transport stream;

decoding new codec information contained in the codec packet;

comparing the new codec information that has been decoded with existing codec information;

upgrading to a new codec when the new codec information is a higher version than the existing codec information;

searching for a codec that drives a channel when the channel is switched to; transmitting a codec request message when the codec that is searched for does not exist;

determining a device that will receive the codec packet based on the decoded new codec information; and transmitting the code packet to the device, wherein information regarding the device is contained in a header of the codec packet.

11. The method of claim 10, further comprising:

searching for a stream type with respect to a program and corresponding codec information in the transport stream transmitted from the broadcaster; and displaying the corresponding codec information about the program on an electronic program guide based on the corresponding codec information.

12. The method of claim 11, wherein the displayed corresponding codec information comprises a corresponding name of a format of the codec.

13. The method of claim 10, wherein the codec packet comprises manufacturer information, product information, a product type, a codec format, and version information.

14. The method of claim 10, wherein the transport stream transmitted from the broadcaster comprises at least one of program service information (PSI) or program and service information protocol (PSIP).

* * * * *